US012507326B2

(12) United States Patent
Kuchler et al.

(10) Patent No.: US 12,507,326 B2
(45) Date of Patent: Dec. 23, 2025

(54) DETECTING SPARK-OVERS DURING A MICROWAVE TREATMENT PROCESS OF A DOMESTIC MICROWAVE APPLIANCE

(71) Applicant: BSH Hausgeräte GmbH, Munich (DE)

(72) Inventors: Markus Kuchler, Gstadt am Chiemsee (DE); Kerstin Rigorth, Mühldorf (DE); Sebastian Sterz, Großaitingen (DE); Matthias De, Gundelfingen Donau (DE)

(73) Assignee: BSH Hausgeräte GmbH, Munich (DE)

( * ) Notice: Subject to any disclaimer, the term of this patent is extended or adjusted under 35 U.S.C. 154(b) by 590 days.

(21) Appl. No.: 18/010,476

(22) PCT Filed: Jun. 24, 2021

(86) PCT No.: PCT/EP2021/067287
§ 371 (c)(1),
(2) Date: Dec. 15, 2022

(87) PCT Pub. No.: WO2022/008257
PCT Pub. Date: Jan. 13, 2022

(65) Prior Publication Data

US 2023/0135333 A1 May 4, 2023

(30) Foreign Application Priority Data

Jul. 8, 2020 (DE) ......................... 102020208535.8

(51) Int. Cl.
*H05B 6/64* (2006.01)
*H05B 6/66* (2006.01)

(52) U.S. Cl.
CPC ........... *H05B 6/6432* (2013.01); *H05B 6/666* (2013.01)

(58) Field of Classification Search
CPC .... H05B 6/6432; H05B 6/6447; H05B 6/666; H05B 6/68; H05B 6/72; H05B 6/725; H05B 6/76
See application file for complete search history.

(56) References Cited

U.S. PATENT DOCUMENTS 3,679,908 A 7/1972 Mazza
3,746,824 A 7/1973 Prucha
(Continued)

FOREIGN PATENT DOCUMENTS

DE 19537755 A1 4/1997
EP 2148553 A1 1/2010
(Continued)

OTHER PUBLICATIONS

International Search Report PCT/EP2021/067287 dated Sep. 15, 2021.

*Primary Examiner* — Hung D Nguyen
(74) *Attorney, Agent, or Firm* — Michael E. Tschupp; Andre Pallapies; Brandon G. Braun

(57) ABSTRACT

In a method for detecting spark-overs in a treatment compartment of a household microwave appliance during a microwave treatment process, a setting value of a microwave operating parameter can be varied during the microwave treatment process. During the microwave treatment process, measurement values of a leakage radiation are measured several times in succession under same setting values of the microwave operating parameter, and a spark-over is detected when a fluctuation range of the measurement values achieves or exceeds a predetermined fluctuation range.

11 Claims, 4 Drawing Sheets

(56) References Cited

U.S. PATENT DOCUMENTS

| | | | |
|---|---|---|---|
| 3,748,424 | A | 7/1973 | Fitzmayer |
| 4,354,153 | A | 10/1982 | Entz |
| 2018/0092165 | A1 | 3/2018 | Carcano |

FOREIGN PATENT DOCUMENTS

| | | | |
|---|---|---|---|
| EP | 2152047 | A1 | 2/2010 |
| EP | 2418916 | A1 | 2/2012 |
| JP | 2009019796 | A | 1/2009 |
| JP | 2009127922 | A | 6/2009 |
| JP | 2009127923 | A | 6/2009 |
| JP | 2009250444 | A | 10/2009 |

DETECTING SPARK-OVERS DURING A MICROWAVE TREATMENT PROCESS OF A DOMESTIC MICROWAVE APPLIANCE

CROSS-REFERENCES TO RELATED APPLICATIONS

This application is the U.S. National Stage of International Application No. PCT/EP2021/067287, filed Jun. 24, 2021, which designated the United States and has been published as International Publication No. WO 2022/008257 A1 and which claims the priority of German Patent Application, Serial No. 10 2020 208 535.8, filed Jul. 8, 2020, pursuant to 35 U.S.C. 119(a)-(d).

The contents of International Application No. PCT/EP2021/067287 and German Patent Application, Serial No. 10 2020 208 535.8 are incorporated herein by reference in their entireties as if fully set forth herein.

BACKGROUND OF THE INVENTION

The invention relates to a method for detecting spark-overs during a microwave treatment process of a household microwave appliance, in the course of which a setting value at least of one microwave operating parameter is varied. The invention also relates to a method for operating a household microwave appliance. The invention relates moreover to a household microwave appliance having a microwave generator for generating microwaves, a microwave treatment compartment, which can be influenced by means of the generated microwaves, and a data processing facility for detecting a spark-over, wherein the household microwave appliance is configured so as to perform at least one of the methods. The invention can be advantageously applied in particular to stand-alone microwave appliances and to baking ovens that have a microwave function.

The formation of spark gaps in microwave appliances is a frequently occurring problem, in particular if the appliances are operated under a small load and in the case of high power settings and/or if unsuitable crockery or accessories are used.

It is possible particularly when transformers are used for the energy supply of a magnetron which only accept the power settings "maximum" or "off" and therefore must be pulsed in order to achieve intermediate power settings, for electric fields that are greater than the break down field strength of the air (approx. 3 kV/mm) to occur at certain points between metallic components or accessories of the cooking appliance. This results in spark gaps which cause an ionization of the air (plasma). Due to the high electrical conductivity of the plasma, a high electrical current can now flow. The very high heating that occurs locally as a result of ohmic losses can sensitively damage the accessories/and/or a cooking compartment wall. By way of example, damage, for example melting, can occur to the protective enamel layers of the cooking compartment wall and holes can even be burnt into the cooking compartment wall or the accessories, beforehand loose parts can also become fixedly welded to one another, etc. In addition, starting points for corrosion occur in this manner. Fundamentally, the problem does however also occur in the case of microwave generators that are equipped with invertors in the case of high power settings.

Customers who operate the cooking appliance in an improper manner, by way of example by using a metal baking tray in the case of high microwave power settings or by using vessels that are unsuitable for microwaves, can thus unintentionally drastically reduce the serviceable life of the appliance and accessories, which results in the disadvantageous involvement of customer services.

In order to detect spark-overs during a microwave treatment process of a household microwave appliance, JP 2009019796 A discloses a measurement method by means of a camera and microphone that detects visible and audible effects of spark-overs.

EP 3 5 16 928 A1 discloses detecting spark-overs with the aid of the presence of harmonics of the fundamental fluctuation frequency of the injected microwaves.

EP 2 880 963 A1 discloses how for this purpose scatter parameters of the injected microwaves can be used.

EP 2 418 916 A1 and U.S. Pat. No. 7,525,074 B disclose to minimize a spark risk in that the presence of metal bodies in the cooking compartment is detected on the basis of impedance measurements.

EP 2 152 047 A1 discloses a safety facility for detecting leakage radiation in the case of a cooking appliance that has a microwave function and a cooking appliance that has a safety facility of this type. This safety facility comprises at least one microwave sensor that comprises a probe in which an alternating current can be induced by leakage radiation or which is suitable to capture alternating currents that are induced into further objects by leakage radiation. The sensor includes moreover a safety device through which the alternating current is passed. Finally, the safety facility includes a facility that is suitable for switching off a microwave source of the cooking appliance as soon as the safety device is triggered.

EP 2 148 553 A1 discloses methods for monitoring microwave leakage. In this case, in the case of a cooking appliance microwave leakage radiation that escapes from the cooking compartment is detected by means of a microwave sensor facility and its temporal progression is stored. A subsequent evaluation of the stored microwave radiation values can include in particular a prognosis of the future temporal progression of the detected microwave radiation and the early signaling that it is anticipated on the basis of the predicted progression that a predetermined threshold value will be exceeded. The publication likewise discloses a corresponding apparatus for microwave leakage monitoring and a cooking appliance that is equipped with such an apparatus.

DE 2 029 559 A1 discloses a safety apparatus to prevent radiation escaping from microwave appliances, wherein at least one microwave responsive gas tube is used which is arranged in the proximity of the zone of a possible radiation discharge and a controlled semiconductor diode is electrically connected in the electrical control circuit and for its part said controlled semiconductor diode lies in the electrical supply circuit of a relay which when excited causes the electrical supply circuit of a microwave generator to open.

DE 195 37 755 A1 discloses a microwave oven, in particular for a laboratory, having a heating chamber which is surrounded by a housing and into which microwaves can be coupled, and said heating chamber is accessible by way of an access opening that can be closed. A microwave sensor is arranged in such a way in the region of a gap, which issues from the heating chamber of the housing, that if microwave radiation that is exceeding a specific value enters and/or passes through the gap the sensor activates the output of a warning signal or switches off the microwave supply to the heating chamber.

A disadvantage has been hitherto inter alia the necessity to provide cost-intensive hardware, such as cameras, microphones or complex HF measuring technology in order to detect the occurrence of sparks during microwave injection.

BRIEF SUMMARY OF THE INVENTION

The object of the present invention is to overcome the disadvantages of the prior art at least in part and in particular to render it possible in a reliable manner and with little outlay regarding equipment to detect spark-overs during a microwave treatment process of a household microwave appliance.

This object is achieved in accordance with the features of the independent claims. Advantageous embodiments are subjects of the dependent claims, the description and the drawings.

The object is achieved by a method for detecting spark-overs in a treatment compartment of a household microwave appliance during a microwave treatment process, in the course of which a setting value of at least one microwave operating parameter is varied, wherein in the case of the method:

during the microwave treatment process a microwave leakage radiation is measured several times in succession under the same setting values of the at least one microwave operating parameter and a spark-over is detected if measurement values of the microwave leakage radiation for multiple measurements that are performed under the same setting values of the at least one microwave operating parameter exceed a predetermined fluctuation range.

This method provides the advantage that it is possible to detect in a reliable manner sparks that are occurring in the treatment compartment at and between the participating components, such as a wall of the treatment compartment, accessories and cookware. The technical implementation is in addition very cost-effective. As a result of the thus possible safety and protection function to prevent sparks, the serviceable life of the cooking appliance and the accessories can be increased and customers can be protected against injury in regions which are overheated as a result of spark-overs.

This method uses the leakage radiation, which is escaping to the outside through openings, cable guides etc. of a wall of a treatment compartment, as a very sensitive indicator that sparks have occurred in the treatment compartment. This relates to the discovery that spark-overs represent a disturbance of the microwave field conditions that are prevailing in the treatment compartment (arrangements, modes, etc.) and consequently also of the leakage radiation that is dependent thereon. Due to the in part chaotic characteristics of the spark-overs, the spark-overs cause a very considerable spread or fluctuation of the measurement values that represent the strength of the microwave leakage radiation.

The microwave treatment process can be initiated for example by a user or by a cooking program. During the microwave treatment process, microwaves are injected into the treatment compartment of the household microwave appliance, typically in order to microwave the product (for example food to be cooked) that is located therein.

The household microwave appliance can be a household microwave cooking appliance, by way of example a stand-alone microwave appliance or a microwave/oven combination, for example a microwave appliance having at least one additional radiation heating body or a baking oven that has a microwave function. When it is provided in a household microwave cooking appliance, the treatment compartment can also be referred to as a cooking compartment which is surrounded by a cooking compartment wall.

The household microwave appliance typically has a microwave generator for generating microwaves and a treatment compartment that can be influenced by means of the generated microwaves. It is mostly a front-side loading opening which can be closed by a door in a microwave-tight manner. The microwave generator can be a magnetron or a semiconductor-based microwave generator. It can be operated in a pulsed manner or it can be controlled by an inverter. The microwave frequency can be for example in the range of 915 MHz or 2.45 GHz. The microwave generator can inject the microwaves directly or via a microwave guide into the treatment compartment. In addition, it is also possible to provide means for distributing microwaves in the treatment compartment, such as in particular rotatable injection antennae, stirrers, wobblers etc. The generation and introduction of microwaves into the treatment compartment is fundamentally well known and is therefore not mentioned further here.

The leakage radiation that is escaping from the treatment compartment during a microwave operating process or during exposure of the treatment compartment to microwaves can be measured by means of at least one microwave detection facility. The microwave detection facility can be provided for example for detecting microwave leakage radiation in a region of the household microwave appliance between a wall of the treatment compartment (can also be referred to as a cooking compartment wall or muffle) and an outer housing but also in door gaps etc.

The microwaves can be injected into the treatment compartment in particular by setting a specific setting value from a set of multiple possible setting values of at least a variable microwave operating parameter. Thus, a respective set of multiple settable setting values is allocated to each variable microwave operating parameter. During a microwave treatment process, it is possible to vary at least some of the setting values of at least one of the microwave operating parameters, in particular according to a predetermined rule or sequence, for example in a cyclic manner. A microwave operating parameter can be understood to be in particular an operating parameter which when changed can noticeably change a power distribution or a mode image of the microwaves in the treatment compartment.

The at least one microwave operating parameter can include precisely one microwave operating parameter or multiple microwave operating parameters.

The measurement value reflects the strength of the leakage radiation, by way of example its power, energy, amplitude etc. The measurement value can be an electrical characteristic variable, such as a voltage or a digital value resulting therefrom, which is generated in the microwave detection facility as a result of the exposure to microwaves.

The microwave leakage radiation being measured several times in succession under the same setting values of the at least one microwave operating parameter or under the same combination of setting values includes in particular that the measurements are performed under the same setting values of all the microwave operating parameters that significantly influence the field distribution of the microwaves in the treatment compartment (in the case of only one microwave operating parameter: under the same setting value).

The fluctuation range is determined for at least one specific combination of setting values, since—under undisturbed conditions—in the case of the same setting values, an identical field distribution of the microwaves in the treatment compartment occurs with a high degree of reproducibility. However, this field distribution is noticeably disturbed by spark formation. The fluctuation range is determined in particular for all the combinations of setting values that are repeatedly accepted or set during the microwave treatment process.

The "predetermined fluctuation range" corresponds to a threshold or limit value. If the measured fluctuation range remains below the predetermined fluctuation range, it is assumed that spark formation has not occurred.

In one embodiment the at least one microwave operating parameter includes at least one microwave operating parameter from the group:

- angle of rotation of at least one rotary antenna,
- angle of rotation of at least one stirrer,
- angle of rotation of a rotary plate,
- power of the irradiated microwaves,
- frequency of the irradiated microwaves,
- phase difference between microwaves that are irradiated via different injection points,
- power difference between microwaves that are irradiated via different injection points.

In this case, it is possible during a microwave treatment process to set different combinations of setting values of these microwave operating parameters one after the other, for example in a cyclic manner, according to a predetermined rule or scheme.

The setting values of the rotary antenna having its microwave operating parameter "angle of rotation φ can be for example in the angle ranges [0°; 180°] or [0°; 360°], for example having a step width of 1°, 5° or 10°.

The frequency f of the irradiated microwaves can be varied for example between 2.4 GHz and 2.5 GHz, for example in steps of 0.01 GHZ.

During a microwave treatment operation, only the setting values of the angle of rotation φ of the rotary antenna are varied in one exemplary variant, for example in increasing or reducing angle steps (for example 0°, 10°, 20°, . . . ) or in a different sequence (for example 0°, 30°, 20°, 60°, etc.). The "combinations of setting values" represent the setting values themselves—since only a single microwave operating parameter is varied here. A respective fluctuation range is determined for respective setting values repeatedly measured at least at two measurement values (for example at least two measurements for the angle 0°, at least two measurements for the angle 10°, etc.) and said respective fluctuation range is compared with a predetermined fluctuation range or threshold value or measured value.

If, in a further exemplary variant during a microwave treatment operation, the setting values of the angle of rotation φ of the rotary antenna and the setting values of the frequency f of the irradiated microwaves are varied, multiple measurements of the strength of the leakage radiation are performed for multiple, in particular all, combinations of setting values and a respective fluctuation range is determined for each of the combinations and compared with a predetermined fluctuation range. The combinations can include by way of example all pairings of setting values of the angle of rotation φ and frequency f that are repeatedly run through during the microwave treatment operation, for example the pairs [φ; f]=[0°; 2.4 GHz], [10°; 2.4 GHz], . . . , [0°; 2.41 GHz], . . . , [350°; 2.5 GHz], etc.

In one embodiment, the measurement values of the microwave leakage radiation are measured or recorded by means of a sniffing line that is arranged outside a treatment compartment, said sniffing line representing a component of a microwave detection facility. A "sniffing line" is understood to be in particular an electrically conductive line in which alternating currents can be induced by microwaves. The strength (for example power, amplitude, etc.) of the induced alternating currents is representative for the strength of the microwave leakage radiation being induced. The sniffing line is connected to an evaluation circuit of the microwave leakage radiation, which converts the alternating currents in corresponding measurement values ("leakage radiation measurement values"), for example into an electric voltage. The evaluation circuit can be connected to one or multiple sniffing lines. The provision of the sniffing line produces the advantage that it can be rooted in a particularly variable manner in the appliance, for example because it is connected at one end in terms of function to the evaluation circuit but the other end is a freely positionable end. It is possible to use as the sniffing line for example a wire, cable, a conductor track that is applied to a substrate, etc. and alternating currents can be induced therein by means of the microwaves that are generated by the microwave generator.

In one embodiment, the fluctuation range is a difference between a minimum value and a maximum value from a quantity of multiple (in other words at least two) leakage radiation measurement values that are measured under the same setting values of the at least one microwave operating parameter.

In one embodiment, the fluctuation range is a standard deviation that is calculated with the aid of a quantity of multiple leakage radiation measurement values that are measured under the same setting values of the at least one microwave operating parameter.

In one embodiment, a spark-over is detected if the predetermined fluctuation range is achieved or exceeded for precisely one combination of setting values of the at least one microwave operating parameter. Thus, a particularly sensitive detection of a spark-over is advantageously provided.

In one embodiment, a spark-over is detected if the fluctuation range is achieved or exceeded for multiple combinations of setting values of the at least one microwave operating parameter. Thus, the advantage is achieved that a particularly robust detection of a spark-over is provided. In the case of this embodiment, therefore, different combinations of setting values are repeatedly set during a microwave treatment process, and the respective fluctuation ranges are determined and compared with a predetermined fluctuation range. The predetermined fluctuation range can be the same or different for at least two different combinations of setting values.

In one embodiment, the predetermined fluctuation range is fixedly predetermined for the microwave treatment process. The predetermined fluctuation range can be determined for example in an experimental manner. It can be the same for all the combinations of setting values or it can be different for different combinations of setting values, for example different for different set angles of rotation of a rotary antenna.

In one embodiment the predetermined fluctuation range is dynamically adapted with the aid of the measurement values that are measured or recorded during the microwave treatment process. Thus, the advantage is achieved that spark formation can be detected in a particularly reliable manner.

In one embodiment, the fluctuation range that is predetermined for a specific combination of setting values of the microwave operating parameters corresponds to a product of an average fluctuation range, which is determined for multiple—in particular for all—combinations of setting values, and a factor A with A>1. This renders it possible in a particularly simple manner to implement a dynamic adaptation of the predetermined fluctuation range. The factor A can be determined for example in an empirical or experimental manner. By way of example, it is possible to determine the predetermined fluctuation range LMS_thr as $LMS\_thr = A \cdot \overline{LMS}$ with $\overline{LMS}$ the average of the fluctuation ranges LMS of the leakage radiation measurement values LM for multiple combinations of setting values and A a predetermined factor with $A>1$. The factor A does not need to be a whole number. The factor A can be the same or different for different combinations of setting values.

In one embodiment, the method is only performed or started following a predetermined time period after the start of the microwave treatment process, in particular after the microwave generator is switched on. As a result, it is taken into consideration that the microwave generator during its warm-up phase does not yet achieve a stable fluctuation state and in this initial time period a noticeable spread of the measurement values could be caused without spark formation. In one development, the method is only performed five to ten seconds after the start of the microwave treatment process since then any fluctuation of the microwave leakage power or of the leakage radiation measurement values has already noticeably decreased as a result of the warming effects of the microwave generator or said fluctuation has become insignificantly small.

The object is also achieved by a method for operating a household microwave appliance, wherein at least one action is triggered if a spark-over is detected by means of the method as described above. The method can be designed in a similar manner to the method for detecting spark-overs and has the same advantages.

In one embodiment, the least one action includes a reduction of an irradiated microwave power for all the setting values of the microwave operating parameters. This can be implemented in practice in such a way that the microwave power that is irradiated into the treatment compartment is reduced step-by-step. As soon as the microwave power has been reduced to the extent that the breakdown field strength is no longer achieved, the generation of sparks is momentarily terminated, which noticeably manifests itself in a reduced fluctuation range. The microwave power can consequently be reduced step-by-step so long until the measured fluctuation range is below the predetermined limit value or the predetermined fluctuation range, in particular for all the combinations of setting values of the microwave operating parameter. The fluctuation range can be re-calculated after each reduction.

In one embodiment, the at least one action includes a reduction of an irradiated microwave power only for combinations of setting values of the microwave operating parameters in which the predetermined fluctuation range is exceeded. As a result, the irradiated microwave power can be maintained for other combinations of setting values of the microwave operating parameters, wherein the predetermined fluctuation range is not exceeded, which supports a high amount of power being introduced into a product, such as water, food to be cooked etc., which is being microwaved.

In one embodiment, the at least one action includes a temporally shortened injection of microwave irradiation into the treatment compartment for combinations of setting values of microwave operating parameters having a wide fluctuation range and/or a temporarily extended injection of microwave irradiation into the treatment chamber for combinations of setting values of the microwave operating parameters having a small fluctuation range. It is thus also possible to temporally prevent sparks occurring and in addition the duration of influence of the microwaves can be considerably reduced. The temporally shortened injection of the microwave radiation can also include an interruption of the injection.

In one development, the at least one action includes outputting a user instruction to a user by way of the household microwave appliance. The user can be instructed for example to position accessories differently or to reduce the set microwave power.

The object is also achieved by a household microwave appliance comprising a microwave generator for generating microwaves, a treatment compartment that can be influenced by means of the generated microwaves, a microwave detection facility for measuring microwave leakage radiation that is escaping from the treatment compartment and a data processing facility for detecting a spark-over by evaluating the microwave leakage radiation that is measured by the microwave leakage sensor, wherein the household microwave appliance is configured so as to perform at least one of the methods as described above. The household microwave appliance can be designed in a similar manner to the above-described methods, and vice versa, and has the same advantages Thus, the household microwave appliance can have by way of example a microwave detection facility that is equipped with at least one sniffing line. This is used to detect microwave leakage radiation outside the treatment compartment, wherein said microwave detection facility has at least one electrically conductive line (antennae line or "sniffing line"), in which alternating currents can be induced by microwaves, and an evaluation circuit that is connected to the at least one sniffing line and is designed so as to determine alternating currents that are induced in the at least one sniffing line. As a result, the advantage is achieved that the sniffing line can have a long length and can be routed in numerous ways in the household microwave appliance. Thus, it is also possible to monitor large regions of the household microwave appliance outside the treatment compartment for microwave leakage, whereby the number of detection facilities and/or their components can be reduced in comparison to the microwave detection facilities which only perform spot measurements. A particularly reliable and cost-effective construction is consequently rendered possible. A further advantage is that the evaluating circuit can be arranged remotely from leakage radiation cookers in regions of the household microwave appliance that are thermally, chemically and/or electromagnetically loaded to a lesser extent. The sniffing lines are in contrast noticeably more resistant and can also pass without problems through regions that are thermally and chemically loaded (for example hot and/or moist). A further advantage is that microwave leakages can be detected with a high degree of sensitivity. At least one sniffing line can be a dedicated sniffing line in the sense that it does not have any further signaling function (in other words does not conduct current and/or data), in particular does not have any further function. Such a ("pure") sniffing line is provided only for the purpose of detecting microwave-based induction. As an alternative or in addition, at least one sniffing line can have in addition at least one signal conducting function ("combination sniffing line").

The evaluation circuit is in particular configured so as to determine the strength of a microwave-induced current that is induced in the at least one sniffing line and is a measurement for the strength of leakage radiation. The evaluation circuit can have one or multiple electrical and/or electronic components and/or function units such as capacitors, resistors, processors (for example microcontrollers, ASICs, FPGAs), rectifiers, A/D converters etc.

In one development, an evaluating circuit can be connected to precisely one sniffing line and therefore evaluate only this sniffing line or determine the strength of a microwave-induced current that is induced in the at least one sniffing line. In an alternative development, an evaluating circuit is connected to multiple sniffing lines. In this case, multiple sniffing lines can be jointly evaluated by the evaluation circuit. The joint evaluation renders it possible to provide a particularly simple and cost-effective detection facility. It is also possible in addition thereby to increase the size of the detection area that can be covered or scanned, so that the evaluating unit can respond even sooner in the case of a possible leakage. In one development, multiple sniffing lines can be for this purpose routed together electrically and connected at a common junction to the evaluating circuit. Alternatively, multiple sniffing lines can be evaluated individually by means of the same evaluation circuit, for example temporally separate or in parallel. The individual evaluation renders possible an improved localization of a leakage radiation cooker.

Alternatively, the household microwave appliance can have multiple evaluation circuits that are connected for example to one sniffing line respectively. These can be arranged distributed over the household microwave appliance.

In one embodiment, the evaluation circuit is connected via at least one conductor track of a circuit board of the control facility to the at least one sniffing line. Thus, a particularly simple, space-saving and robust connection of the evaluating circuit to the at least one conductor track is possible. A sniffing line is routed in this case in particular to the printed circuit board and connected there to the conductor track, for example by spot welding, clamps, plugs, etc.

In one advantageous embodiment, in particular for combination sniffing lines, the evaluation circuit is connected to the at least one sniffing line via a coupling capacitor. As a result, the advantage is achieved that the sniffing line is galvanically separated from the evaluating circuit but alternating current signals can be transmitted by the coupling capacitor. Therefore, by way of the coupling capacitor, a DC voltage separation is also achieved between the sniffing line and the evaluation circuit. In particular, a connector of the coupling capacitor is electrically connected to at least one sniffing line and the other connector is electrically connected to the evaluating circuit. The coupling capacitor can also represent a part of the evaluating circuit.

In one embodiment, the coupling capacitor is a component of a high pass filter. Thus, the advantage is achieved that the comparatively high frequency microwave-induced alternating currents (that can have for example a frequency in the range of the microwave frequency) are allowed to pass through to the evaluating circuit, whereas low frequency alternating currents, as they are used for example typically for a current supply of a consumer having alternating current (for example a mains frequency of 50 Hz), are not allowed to pass through. As a result, electrical currents are prevented from disturbing the measurement signal of the microwave leakage radiation in combination sniffing lines having low frequencies, which in turn increases the accuracy of an evaluation.

In one development, the coupling capacitor together with an in particular grounded ohmic resistor forms the high pass filter. The resistor can be a component of the evaluating circuit, for example its input resistor.

In one embodiment, the high pass filter has in addition a resistor, in particular an input resistor, which is connected to the coupling capacitor, and the coupling capacitor has a capacitance of the magnitude (Equation 1):

$$C = \frac{1}{2 \cdot \pi \cdot R \cdot f_u}$$

wherein R represents the resistance value of the ohmic resistor and $f_u$ represents a lower limit frequency of the high pass filter.

This formula results from a complex transmission function $\underline{T}$ that reflects the ratio of a voltage $\underline{U_2}$, which is forwarded by the high pass filter, to the voltage $\underline{U_1}$ which is applied to the monitored or tapped sniffing line (Equation 2):

$$\underline{T} = \frac{\underline{U_2}}{\underline{U_1}} = \frac{1}{1 - \frac{i}{2\pi \cdot f \cdot R \cdot C}}$$

Since only the amount of the transmission function (and not its phase position) is of interest here, the following applies (Equation 3):

$$|\underline{T}| = \frac{|\underline{U_2}|}{|\underline{U_1}|} = \frac{1}{\sqrt{1 + \frac{1}{(2\pi \cdot f \cdot R \cdot C)^2}}}$$

It has been assumed for the selection and dimensioning of the coupling capacitor C that a lower limit frequency $f_u$ of the resulting high pass is as high as that at least required by the signal that is to be measured, (the measurement signal has a typical microwave frequency of 915 MHz or 2.45 GHz). The lower limit frequency $\underline{fu}$ is applied in such a way that the transmitted voltage $\underline{U_2}$ is only 1/√2 or approx. 70.7% of the amplitude of the original signal $U_1$ or the original signal $\underline{U_1}$ is attenuated by this factor. It follows from this for the amount of the transmission function:

$$|\underline{T}| = \frac{1}{\sqrt{2}} = \frac{1}{\sqrt{1 + \frac{1}{(2\pi \cdot f \cdot R \cdot C)^2}}}$$

This results in the advantageous variable of the capacitance value C of the coupling capacitor in accordance with Equation 1.

If a pure sniffing line is connected to the evaluating circuit, this does not need to be galvanically separated by a coupling capacitor from the evaluating circuit. It is also possible to forego a high pass filter. Alternatively, the pure sniffing line is also connected via a coupling capacitor and/or a high pass filter.

In one embodiment at least one sniffing line has at least a length of at least 800 mm, in particular of at least 1000 mm, in particular of at least 1500 mm, in particular of at least 2000 mm. Such a long length provides the advantage that as many regions/large regions as possible can be covered in the interior of the housing of the household microwave appliance having a sniffing line and, as a result, spatially distributed leakage radiation cookers can be sensed or detected using a small number of sniffing lines.

Since the leakage radiation cookers are not only spatially distributed but are often also temporally irradiated at different intensities (for example on account of a temporally different mode distribution in the treatment compartment by moving an injection antenna, a stirrer and/or a rotary plate), it is advantageous that the sniffing line has a spatially and where appropriate also temporally integrating characteristic. The superposition of the different irradiated microwave signals then produces the summated signal that is applied at the microwave sensor. This superposition is more greatly enhanced the longer the sniffing line.

BRIEF DESCRIPTION OF THE DRAWINGS

The above-described characteristics, features and advantages of this invention and the manner in which these are achieved will become clearer and more easily understood in conjunction with the following schematic description of an exemplary embodiment that is further explained in connection with the drawings.

DETAILED DESCRIPTION OF EXEMPLARY EMBODIMENTS OF THE PRESENT INVENTION

Figure 1:
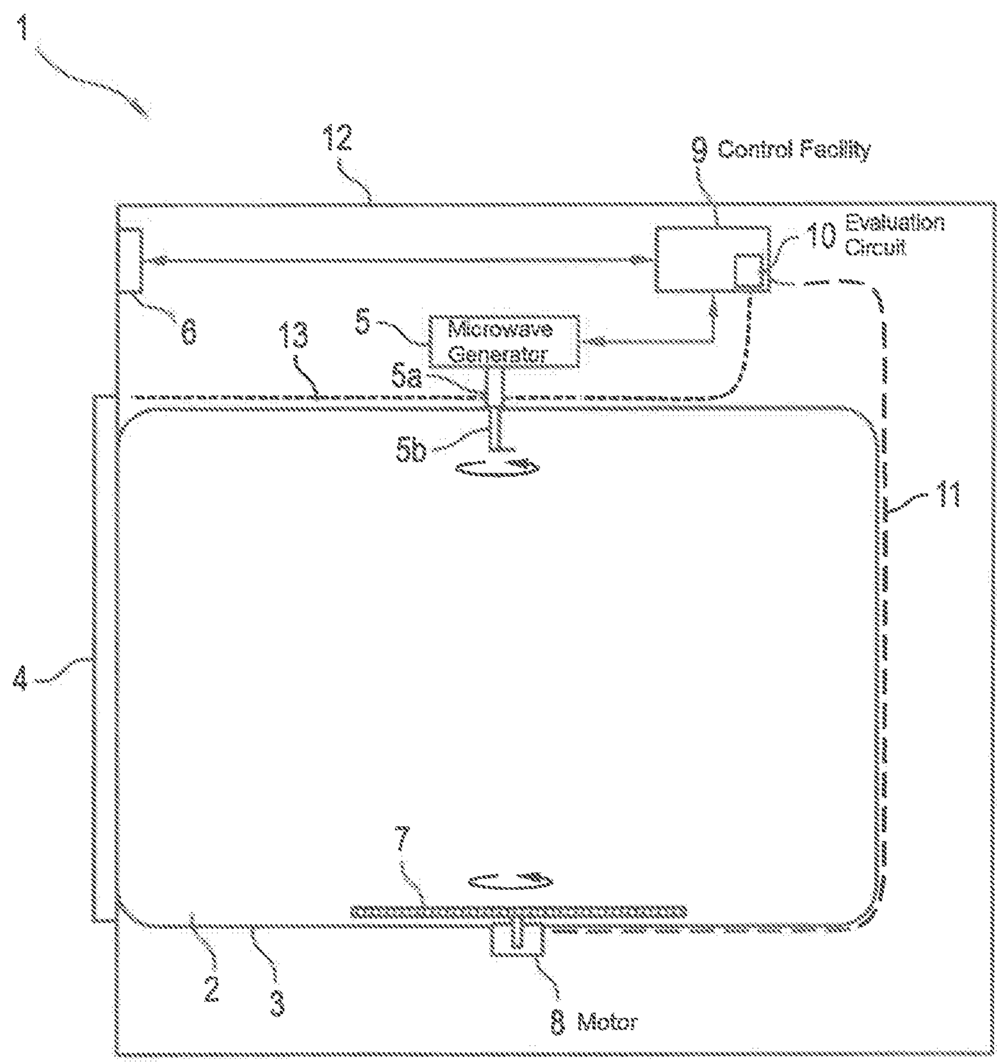
FIG. 1 shows as a sectional view in a side elevation a household microwave appliance.

FIG. 1 illustrates as a sectional view in a side elevation an outline of a household microwave appliance 1 having a treatment compartment in the form of a cooking compartment 2. The household microwave appliance 1 can be for example a baking oven that has microwave functionality.

The cooking compartment 2 is surrounded by a cooking compartment wall or muffle 3 having a front loading opening that can be closed by a door 4. The household microwave appliance 1 has at least one microwave generator 5, where appropriate also further heating elements, such as one or multiple resistance heating elements (not shown), for treating products (not shown) that are located in the cooking compartment 2. The microwaves that are generated by the microwave generator 5 are injected into the cooking compartment 2 via a microwave guide 5*a* by means of a rotary antenna 5*b* that can be rotated about its longitudinal axis by a step motor (not shown).

Moreover, an operating facility 6 is provided, which can have one or multiple operating elements and/or display facilities, for example in the form of a touch-sensitive screen.

In addition or as an alternative to the rotary antenna 5*a*, the household microwave appliance 1 comprises a rotary plate 7 that is provided in the cooking compartment 2 and can rotate by means of a motor 8 that is arranged outside the cooking compartment 2. The household microwave appliance 1 or its controllable components 5, 6, 8 can be controlled or actuated by means of a central control facility 9 (also referred to as an "appliance controller").

An evaluating circuit 10 that is connected to a combination sniffing line 11 is integrated into the control facility 9. In this case, the combination sniffing line 11 is the particular electrical line which leads from the control facility 9 to the motor 8 in order to supply the motor 8 with current and/or to transmit data to the motor 8 in order to control said motor. The combination sniffing line 11 is also suitable for the purpose that alternating currents can be induced into it by microwaves. The evaluating circuit 10 is designed for determining alternating currents that are induced in the antenna line 11. The evaluating circuit 10 and the antenna line 11 form a detection facility 10, 11 for detecting microwave leakage radiation outside the cooking compartment 2, in particular in an intermediate space between the muffle 3 and an outer housing 12 of the household microwave appliance 1. The combination sniffing line 11 has therefore a dual function, namely firstly to transmit current and/or data between the control facility 9 and the motor 8 and secondly as a "sensor line" for detecting microwave leakage radiation. For this purpose, the combination sniffing line 11 can be routed for example around an opening in the muffle 3 through which a drive axle of the motor 8 leads to the rotary plate 7. In addition or as an alternative, the combination sniffing line 11 can have for example a wavy or meandering section that runs for example via mounting joints, further openings or similar of the muffle 3.

The household microwave appliance 1 can have in addition or as an alternative to the combination sniffing line 11 at least one pure sniffing line 13, for example a simple wire or a simple cable, which is connected to the evaluating circuit 10 and is provided only for the purpose of being used as a sensor line.

The combination sniffing line 11 and/or the pure sniffing line 13 can have a length of at least 800 mm, in particular of at least 1000 mm, in particular of at least 1500 mm, in particular of at least 2000 mm.

Figure 2:
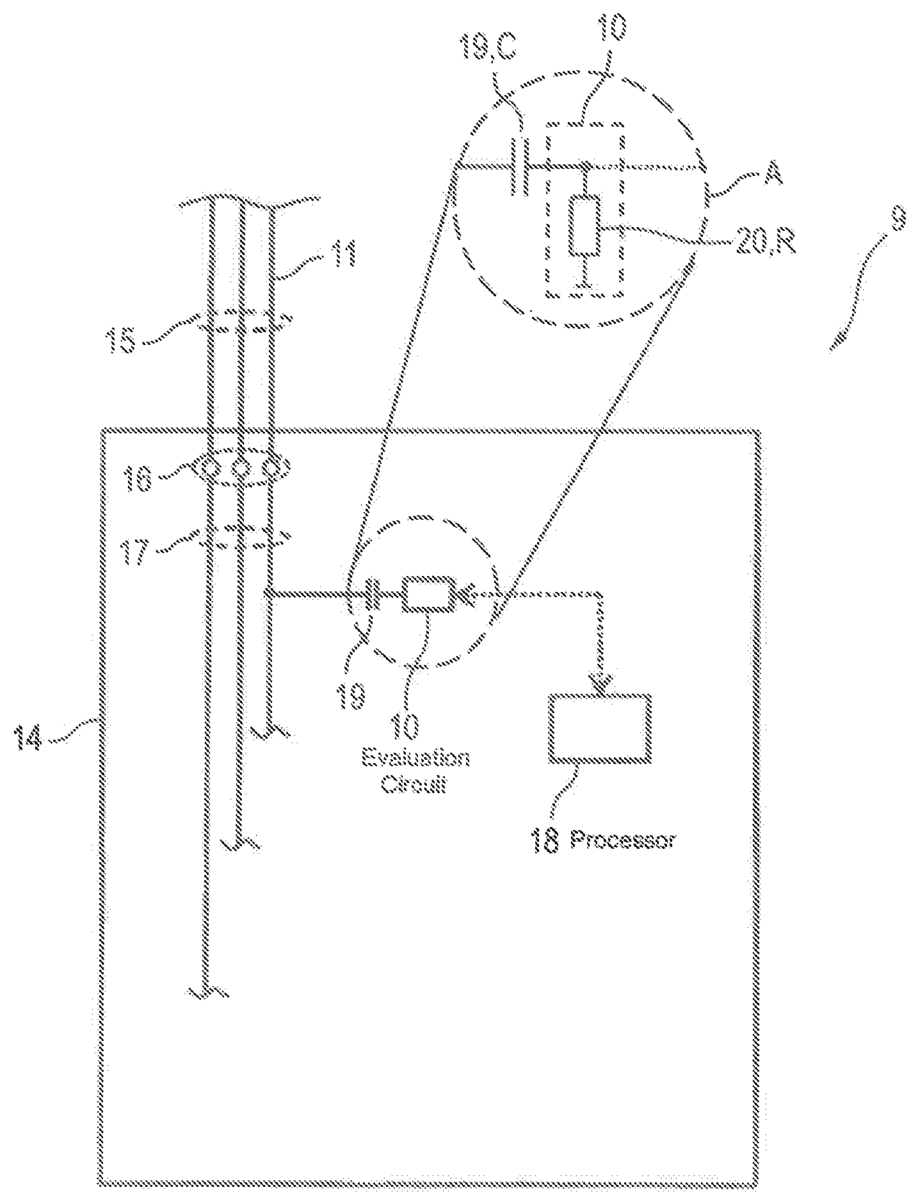
FIG. 2 shows in a plan view a possible evaluating circuit of the household microwave appliance from FIG. 1.

FIG. 2 illustrates in a plan view an outline of the evaluating circuit 10 that is integrated into the control facility 9 and has some further components that are provided on the control facility 9. Multiple electrical lines 15 lead to a circuit board 14 of the control facility 9. The lines 15 can be combination sniffing lines 11, which are connected at their other ends to function units of the household microwave appliance 1 as electric consumers and/or sensors, and/or said lines can be pure sniffing lines 13.

The electrical lines 15 are connected at connection points 16 as clamps or similar to the circuit board 14 and flow there into corresponding conductor tracks 17 of the circuit board 14. In the illustrated exemplary embodiment, only a combination sniffing line 11 is illustrated in a purely exemplary manner connected to an evaluating circuit 10 which is arranged on the circuit board 14 and is connected in turn to a processor 18, for example a microcontroller, ASIC or FPGA, of the control facility 9.

In particular, the evaluating circuit 10 is connected here by the conductor track 17 that is connected to the combination sniffing line 11 via a coupling capacitor 19 which causes an interruption of the DC voltage between the evaluating circuit 10 and the combination sniffing line 11.

The evaluating circuit 10 has, as illustrated in the enlarged section A, at least one ohmic resistor 20 which on the one hand is connected to the connector that is connected to the processor 18 and on the other hand is connected to a predetermined reference potential or ground. The coupling capacitor 19 and the resistor 20 form a high pass filter 19, 20 for the signal that is coming from the combination sniffing line 11.

Advantageously, the coupling capacitor 19 has here a capacitance value C of the magnitude:

$$c = \frac{1}{2 \cdot \pi \cdot R \cdot f_u}$$

wherein R represents the resistance value of the resistor 20 and $f_u$ represents a desired lower limit frequency of the high pass filter 19, 20. The lower limit frequency $f_u$ is selected in such a way that practically only the microwave-induced voltage portions are allowed to pass through.

The—for example analogue—output signal of the evaluating circuit 10 is directed for evaluation to the processor 18 (for example to an analogue input of a microcontroller). However, the evaluating circuit 10 can also have other components or parts (not shown), by way of example an A/D converter, operational amplifier etc.

The control facility 9 can be configured so as, based on a strength of the alternating current which is microwave-induced in the combination sniffing line 11 and is represented by the measurement/output signal of the measurement values of the evaluating circuit 10, to detect spark formation in the cooking compartment 2 during a microwave operation and where appropriate trigger at least one appropriate action, for example to reduce power of the microwave generator 5, to output a message to a user, etc.

Figure 3:
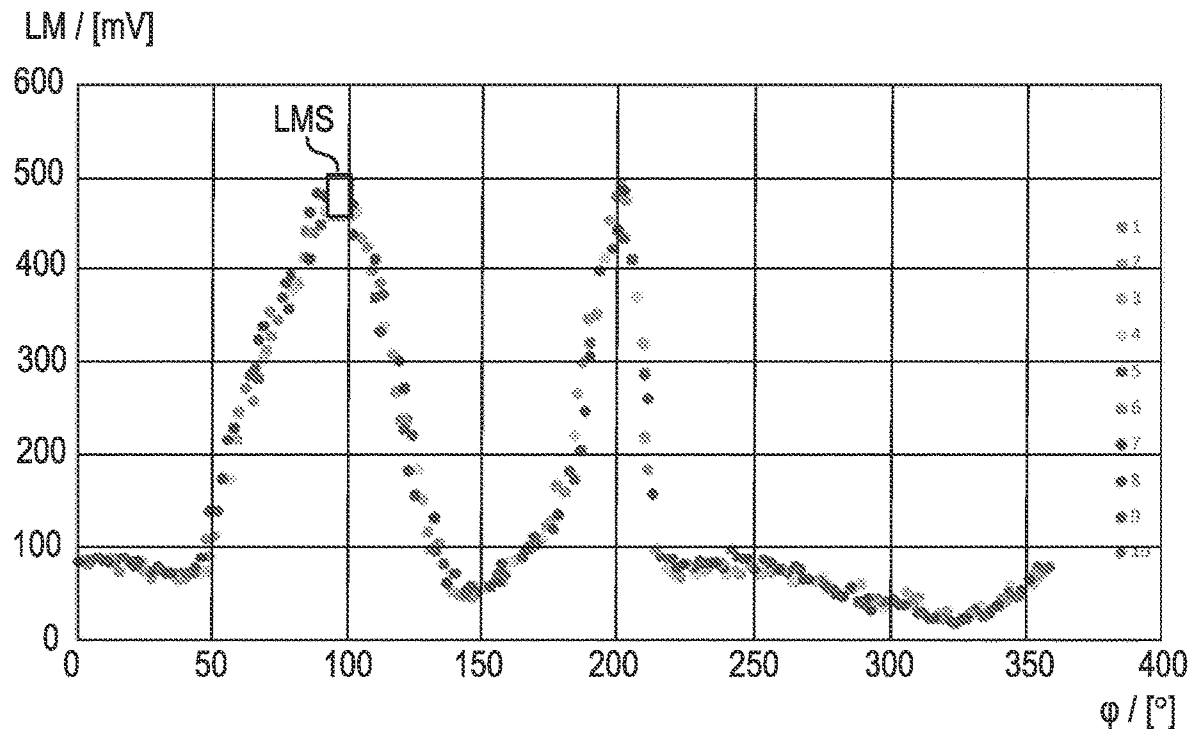
FIG. 3 shows a plot of a measurement of a leakage radiation over an angle of rotation of a rotary antenna without spark formation.

FIG. 3 illustrates a plot of a leakage radiation measurement value LM in mV, which represents the strength of the leakage radiation and is measured by the evaluation circuit 10, as it is output for example by the evaluation circuit 10, over an angle of rotation φ of the rotary antenna 5*b* in degrees in the case of microwave treatment at a power of 600 W of a water load that is placed in the cooking compartment 2 without spark formation.

In this case, it is assumed that a field distribution of the microwaves is set in the cooking compartment 2 only by rotating the rotary antenna 5*b*. The at least one relevant variable microwave operating parameter therefore includes here only the angle of rotation φ of the rotary antenna 5*b*, which can assume setting values in a range [0°; 360°], for example in steps of 1°, 5° or 10°. The rotary antenna 5*b* has the purpose of homogenizing the injected microwave power in the food to be cooked (not shown). During a rotation of the rotary antenna 5*b*, the microwave field changes in the cooking compartment 2 in a cyclic manner and can cause spark-overs under unfavorable but unforeseeable conditions and at specific angles of rotation.

However, in general as an alternative or in addition, further variable settable microwave operating parameters are used, for example:

- an angle of rotation of at least one stirrer (not shown),
- an angle of rotation of the rotary plate (7)
- a power of the irradiated microwaves,
- a frequency of the irradiated microwaves,
- a phase between microwaves that are irradiated via different injection points, (not shown),
- etc.

The plot illustrates that the leakage radiation measurement value LM can be very easily reproduced for ten full rotations of the rotary antenna 5*b*, since as each angle of rotation is passed through a very similar measurement value (within the scope of measurement accuracy) is generated. Therefore, a fluctuation range LMS is small for all setting values of the angle of rotation φ, as is illustrated schematically for the angle value φ=100° (cf. also FIG. 5).

Figure 4:
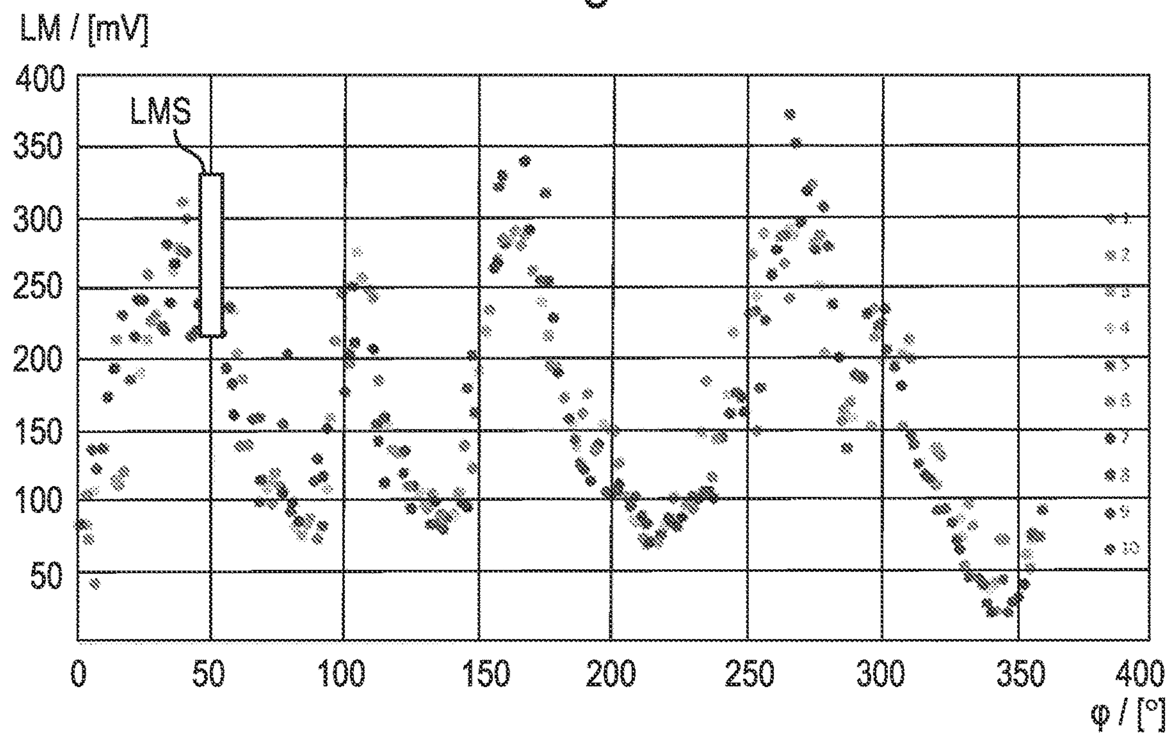
FIG. 4 shows a plot of a measurement of a leakage radiation over an angle of rotation of a rotary antenna with spark formation.

FIG. 4 illustrates a plot of a leakage radiation measurement value LM in mV, which represents the strength of the leakage radiation, over an angle of rotation φ of the rotary antenna 5*b* in degrees in the case of a microwave treatment at a power of 600 W of a water load that is placed in the cooking compartment 2 and in addition in the case of a metal baking tray that is placed in said cooking compartment (not shown). Microwave-based spark formation occurs due to the metal baking tray that is placed in said cooking compartment. The fluctuation range LMS is far greater than for the case illustrated in FIG. 3 without a metal baking tray, as is indicated by way of example for φ=50°.

In this case, it has been demonstrated, for example for a baking oven that has a microwave function, that in the case of microwave powers above 360 W a metal baking tray that is located in the cooking compartment 2 encourages spark formation in particular at sites that are in contact with the shelf rack or pull-out. In this case, spark-overs were regularly visible and audible during the entire microwave operation. The illustrated plot reflects this: due to the random components during spark formation—even nano scale effects and fluctuations can be sufficient in order to vary the intensity and the spatial occurrence of the sparks—the field distribution is now no longer identical when the rotary antenna 5*b* passes through the same angle of rotation φ. This change in the "sparking characteristics" can be observed directly in the leakage rate measurement values or leakage radiation measurement values. In the case of the same angles of rotation φ, these now assume noticeably different setting values in the case of each repeated rotation of the rotary antenna 5*b*.

Figure 5:
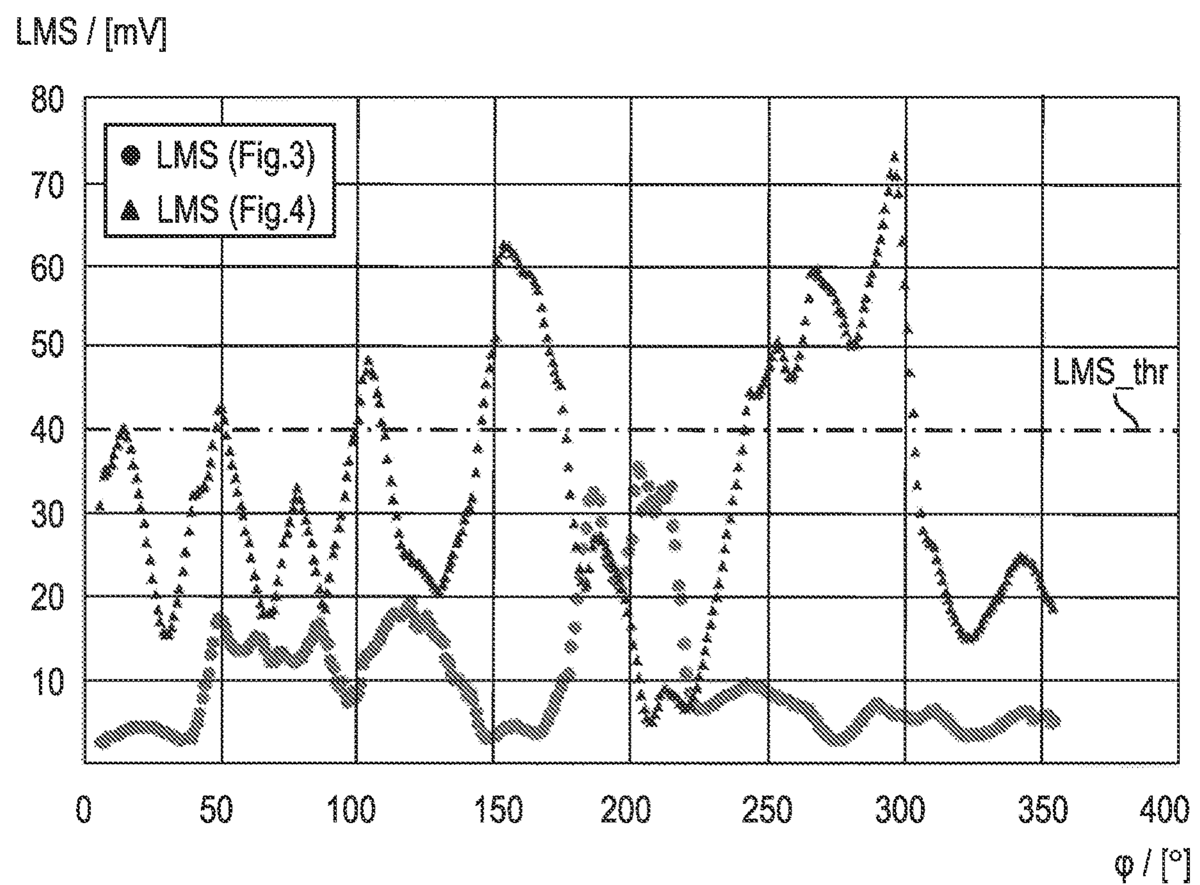
FIG. 5 shows a plot of a fluctuation range of the measurement values of the leakage radiation that are illustrated in FIG. 3 and FIG. 4 over an angle of rotation of a rotary antenna with and without spark formation.

FIG. 5 illustrates a plot of a fluctuation range LMS of the leakage radiation measurement value LM in mV over an angle of rotation φ of the rotary antenna 5*b* in degrees for the leakage radiation measurement values LM from FIG. 3 and FIG. 4, calculated respectively from the standard deviation of the leakage radiation measurement values LM for the individual angle of rotation φ.

The number of antenna rotations that are used for the evaluation is at least two, however, advantageously, it can also be more than two.

It is possible to detect from FIG. 5 in an automated manner whether sparks form or spark-overs occur in the cooking compartment 2. Possible criteria that indicate spark formation can include for example:

- the fluctuation range LMS of the leakage radiation measurement values exceeds a predetermined fluctuation range or a limit value LMS_thr at least once, for a specific setting value of the angle of rotation φ or for a specific angle of rotation range of the range Δφ [φ−Δφ/2; φ+Δφ/2];
- the fluctuation range LMS of the leakage radiation measurement value exceeds the limit value LMS_thr for more than one setting value of the angle of rotation φ or more than an angle of rotation range.

The limit value LMS_thr—in the present case indicated by way of example at LMS=40 mV—can be a fixedly determined value or it can be derived dynamically from the measurement values. By way of example, the limit value LMS_thr can be calculated based on the average value of all fluctuation ranges LMS.

It is also possible in a particularly reliable manner to detect spark formation or spark-overs if the above-mentioned criteria are fulfilled one after the other for more than one measurement cycle (in other words a full run-through of the combinations of the setting values of the microwave operating parameters, here: a full antenna rotation). This is particularly advantageous since the measurement accuracy can deliver erroneous results particularly at steep sides of the measurement value progressions (cf. for example FIG. 3 in the angle range φ=[180°; 210°]. In general, however, the direct comparison of FIG. 3 and FIG. 4 renders it possible to detect with a great degree of reliability spark formations or spark-overs.

In order to even further increase improvement of the reliability when detecting spark formation or spark-overs—in particular without so-called "false positives"—the leakage radiation measurement values LM or progressions thereof (for example illustrated in FIG. 3 and FIG. 4) can be subjected to a data processing. By way of example, the leakage radiation measurement values LM cannot be derived from the first (for example five to ten) seconds of a microwave operation since the magnetron 5 has not yet achieved a stable fluctuating state during its warm-up phase and would therefore possibly also cause a spread of the leakage radiation measurement values LM even without spark formation.

The leakage radiation measurement values LM can also be subjected to a curve adaptation (for example by interpolation) and/or a smoothening.

If spark formation or spark-overs are detected, one action can be in the form of a counter measure to reduce step-by-step the microwave power that is irradiated into the cooking compartment 2. As soon as the microwave power has been reduced to the extent that the breakdown field strength is no longer achieved, the generation of sparks is momentarily terminated, which can be detected in a greatly reduced fluctuation range LMS.

In addition or as an alternative, it is possible by means of controlling the step motor of the rotary antenna 5*b* by the control facility 9 to run quicker through or omit angle ranges having an increased fluctuation range LMS. In angle ranges that have a small fluctuation range LMS, the rotary antenna 5*b* can be rotated more slowly. As a consequence, a time window for sparks to occur and consequently a treatment duration or cooking duration are considerably reduced. From FIG. 5, exemplary angle ranges in which the rotary antenna 5*b* is rotating slower or quicker can be determined for the scenario described in FIG. 4:

rapid rotation for the angle ranges [10°; 20°]. [45°; 55°], [100°; 110°], [140°; 170°]. [240°; 300°];

slowed down rotation for the angle regions [20°; 45°], [60°; 95°], [110°; 135°]. [180°; 230°], [310° ' 360°].

Also, it is possible to initiate an interaction of the household microwave appliance with the user, whereby the user is instructed to remove the accessory, to position it differently or to reduce the set microwave power.

Naturally, the present invention is not limited to the illustrated exemplary embodiment.

In general, "a" "an" etc. can be understood to be a single number or a plurality, in particular in the sense of "at least one" or "one or multiple" etc., as long as this is not explicitly excluded, for example by the expression "precisely one" etc.

Also, a number specification can include precisely the quoted number and also a usual tolerance range as long as this is not explicitly excluded.

LIST OF REFERENCE CHARACTERS

1 Household microwave appliance
2 Cooking compartment
3 Muffle
4 Door
5 Microwave generator
5*a* Microwave guide
5*b* Rotary antenna
6 Operating facility
7 Rotary plate
8 Motor
9 Control facility
10 Evaluating circuit
11 Combination sniffing line
12 Housing
13 Pure sniffing line
14 Circuit board
15 Electrical line
16 Connection point
17 Conductor track
18 Processor
19 Coupling capacitor
20 Resistor
A Section
C Capacitance value
LM Leakage radiation measurement value
LMS Fluctuation range of the leakage radiation measurement value
LMS_thr Predetermined fluctuation range/limit value
R Resistance value
φ Angle of rotation of the rotary antenna

The invention claimed is:

1. A method, comprising:

varying a setting value of a microwave operating parameter during a microwave treatment process in a treatment compartment of a household microwave appliance;

during the microwave treatment process, measuring measurement values of a leakage radiation several times in succession under same setting values of the microwave operating parameter; and detecting a spark-over when a fluctuation range of the measurement values under the same setting values achieves or exceeds a predetermined fluctuation range.

2. The method of claim 1, wherein the measurement values of the leakage radiation are measured via a sniffing line arranged outside the treatment compartment.

3. The method of claim 1, wherein the fluctuation range is a difference between a minimum value and a maximum value of measurement values that are measured under the same setting values of the microwave operating parameter.

4. The method of claim 1, wherein the fluctuation range is a standard deviation of measurement values that are measured under the same setting values of the microwave operating parameter.

5. The method of claim 1, wherein the spark-over is detected when the fluctuation range for a combination of setting values of the microwave operating parameter is achieved or exceeded.

6. The method of claim 1, wherein the spark-over is detected when the fluctuation range is achieved or exceeded for multiple combinations of setting values of the microwave operating parameter.

7. The method of claim 1, further comprising fixing the predetermined fluctuation range for the microwave treatment process.

8. The method of claim 1, further comprising dynamically adapting the predetermined fluctuation range in response to the measurement values.

9. The method of claim 8, wherein the fluctuation range that is predetermined for a specific combination of setting values of the microwave operating parameter corresponds to a product of an average fluctuation range, which is determined for multiple combinations of setting values, and a factor A with A>1.

10. The method of claim 1, wherein the microwave operating parameter is a microwave operating parameter selected from the group consisting of:

angle of rotation of a rotary antenna,
angle of rotation of a stirrer,
angle of rotation of a rotary plate,
power of irradiated microwaves,
frequency of irradiated microwaves,
phase between microwaves that are irradiated via different injection points.

11. The method of claim 1, wherein the method is only performed following a predetermined time period after a start of the microwave treatment process.

* * * * *